United States Patent [19]
Chadwick

[11] 3,909,707
[45] Sept. 30, 1975

[54] FREQUENCY RATIO INDICATING CIRCUIT ARRANGEMENTS

[75] Inventor: Peter Chadwick, Stockport, England

[73] Assignee: Ferranti, Limited, Hollinwood, England

[22] Filed: May 10, 1974

[21] Appl. No.: 469,020

[30] Foreign Application Priority Data
May 11, 1973 United Kingdom............... 22654/73

[52] U.S. Cl. ............... 324/161; 340/271; 324/79 D
[51] Int. Cl.² .....................G01P 3/56; G08B 21/00; G01R 23/14
[58] Field of Search .......... 324/79 D, 161; 340/271, 340/263; 317/5, 6; 328/161

[56] References Cited
UNITED STATES PATENTS

| | | | |
|---|---|---|---|
| 3,537,002 | 10/1970 | Haner et al. | 324/79 D |
| 3,623,059 | 11/1971 | Rickerd | 340/271 |
| 3,696,293 | 10/1972 | Hoffmann et al. | 324/79 D X |
| 3,728,627 | 4/1973 | Petersen et al. | 324/161 X |

*Primary Examiner*—Alfred E. Smith
*Assistant Examiner*—Rolf Hille
*Attorney, Agent, or Firm*—Cameron, Kerkam, Sutton, Stowell & Stowell

[57] ABSTRACT

A frequency ratio indicating circuit arrangement, operable to indicate within which one of a number of ranges lies the ratio of pulse repetition frequencies of two pulse trains, comprises a series of J-K bistable devices which are primed by individual bistable latches to produce an output indication signal when triggered in accordance with whether the latches are in a SET or RESET state. Each latch is SET by a pulse, passed by a combination of logic gates, from a resettable counter of input pulses of one pulse train, the series of logic gates opening at various stages in the count in accordance with their interconnection pattern with the counter. The SET and RESET inputs of adjacent latches are connected in parallel such that as the count proceeds, each latch is SET in turn with the previously SET latch being RESET. Pulses of the other train are counted and at every tenth pulse cause the J-K bistable devices to be triggered and, subsequently, the counter and latches to be RESET. Whichever J-K device is primed at the time of the trigger pulse provides an indication signal to show in which range of ratios, that is, between which stages of count for which the appropriate latch is SET, the trigger pulse occurs.

10 Claims, 1 Drawing Figure

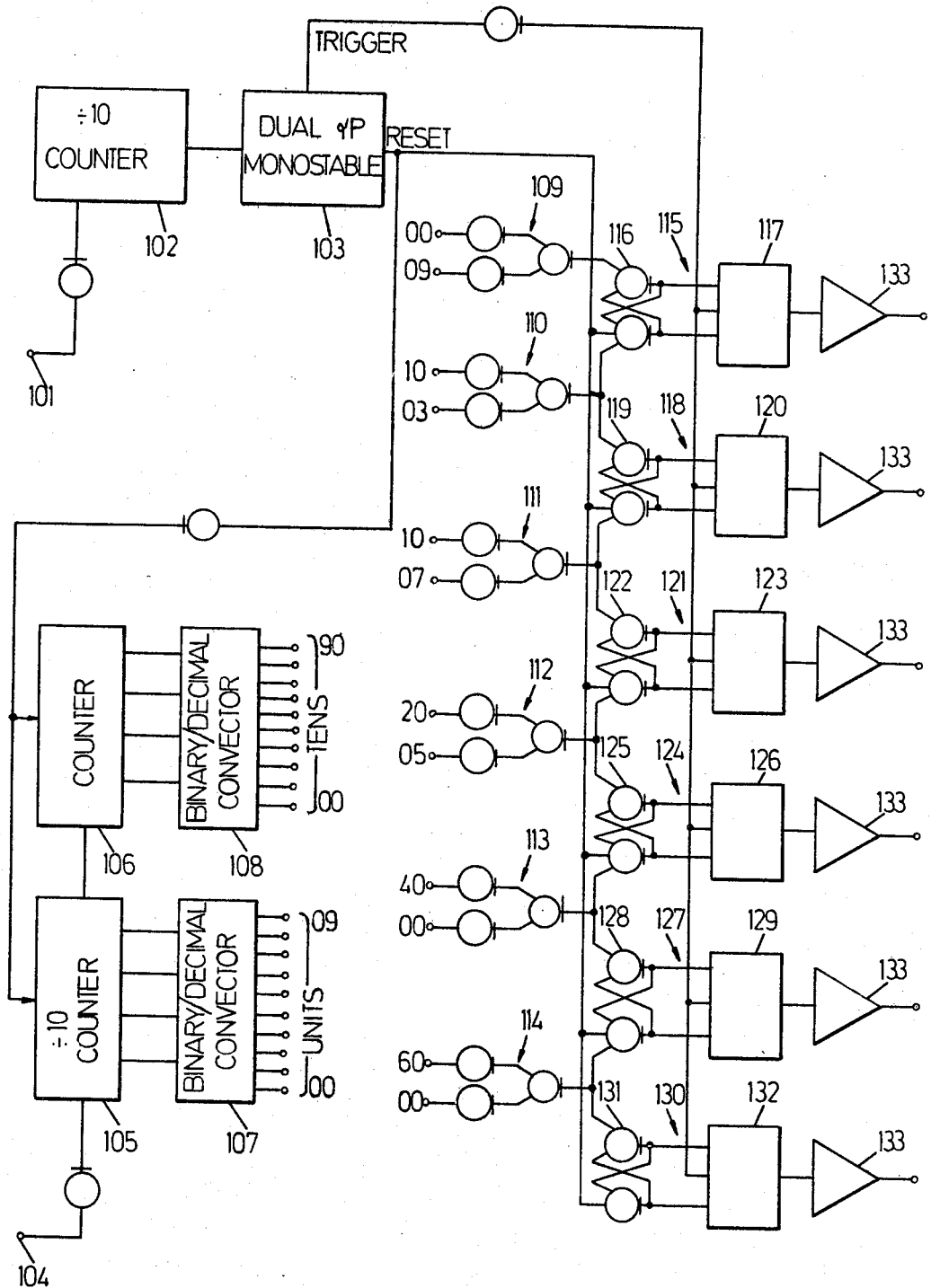

FREQUENCY RATIO INDICATING CIRCUIT ARRANGEMENTS

This invention relates to frequency ratio indicating circuit arrangements and in particular to such circuit arrangements which are operable to provide a signal indicative of within which one of a number of ranges lies the ratio of the pulse repetition frequencies of two pulse trains.

Circuit arrangements are known for determining the ratio of pulse repetition frequencies between two pulse trains by counting the number of pulses of one train for a period determined by the time required to count a predetermined number of pulses of the other train and expressing the result as a ratio. The circuit may be relatively complex by being arranged to give a continuously updated value for the ratio or more simply may give an indication whether or not the ratio is greater or less than a threshold value.

It is an object of the present invention to provide a frequency ratio indicating circuit of simple construction and operable to indicate within which one of a number of ranges lies the ratio of the pulse repetition frequencies of two pulse trains.

According to the present invention a frequency ratio indicating circuit arrangement, operable to indicate within which one of a number of ranges lies the ratio of the pulse repetition frequencies of two pulse trains, comprises first and second input terminals each arranged to receive pulses from an individual pulse train, first counting means operable to count the pulses applied to the first input terminal and to produce a timing signal after a predetermined number of pulses have been counted, second, resettable counting means having a plurality of output terminals and operable to count pulses applied to the second input terminal to produce at selected output terminals, at predetermined stages in the count, range signals representative of the number of pulses counted, output means comprising a plurality of triggerable output devices, each capable of being placed in a SET state or in a RESET state and each operable to produce an indication signal if triggered when in a SET state, gating means responsive to the range signals from the second counting means both to SET a different output device at each of said predetermined stages in the count and to RESET a previously SET output device, and control means responsive to the timing signal of the first counting means to apply a triggering signal to all of the output devices and thereafter to apply a RESET signal to the second counting means and to all of the output devices.

An embodiment of the present invention will now be described by way of example with reference to the accompanying drawing, in which the single FIGURE is a schematic representation of a frequency ratio indicating circuit arrangement according to the present invention.

The ratio detector is employed to provide a visual indication of which gear is engaged in a gear box (not shown) having, say, six fixed ratios. A transducer (also not shown), driven by the output shaft of the gear box provides, say, 1 pulse per revolution; a similar transducer is driven by the input shaft. Supposing that the gear ratios are 8.2 : 1, 5.0: 1, 3.1 : 1, 2.1 : 1, 1.5 : 1 and 1.1 : 1 for gears one to six respectively, then for every 10 output shaft pulses the number of input shaft pulses will 82, 50, 31, 21, 15 and 11 respectively, and the ratio of the number of input pulses to the number of output pulses gives an indication of which gear is selected.

Referring now to the FIGURE, the gear box output-shaft pulses are fed to a first input terminal 101 and then to first counting means comprising a divide-by-ten counter 102. The output terminal of the counter 102 is connected to control means 103, comprising a dual-output monostable circuit. The gear box input-shaft pulses are fed by way of a second input terminal 104 to second counting means comprising two serially connected counting stages comprising counters 105 and 106 and two binary-to-decimal converters 107 and 108 respectively. The counter 105 has a divide-by-ten counter and produces an input pulse for the counter 106 after every ten input pulses to the counter 105.

Each counter provides a parallel binary output which is fed to its respective binary-to-decimal converters such that the outputs of the binary-to-decimal converters 108 and 107 provide a decimal representation of the number of input shaft pulses counted in "tens" and "units" respectively.

Gating means, comprising an array of six two-input gates 109 to 114, is connected to selected ones of the output terminals of the binary-to-decimal converters 107 and 108 so that each input of each gate receives one tens signal and one units signal.

The output terminal of the gate 109 is connected to a triggerable device 115 comprising a bistable latch 116 and a J-K bistable device 117. An output signal of the gate 109 causes the bistable 116 to SET the latch and prime the J-K bistable device. The output terminal of the gate 110 is connected to a triggerable output device 118 comprising bistable latch 119 and J-K bistable device 120. The output terminal of the gate 110 is also connected to the bistable latch 116 so that as an output signal of the gate 110 causes the bistable 119 to be SET; it also causes the bistable 116 to be RESET; and the J-K bistable device 117 to be placed in an unprimed state. Similar connections exist between gates 111 to 114 and output devices 121 to 130.

The two output terminals of the control means 103 are connected one to a clock, or trigger, input terminal of each J-K bistable device and one to each bistable latch. The control means 103 produces output signals in response to an output signal from the counter 102 and at the first mentioned output terminal provides a triggering signal for the J-K bistable devices and at the least mentioned output terminal provides a RESET signal to place all of the bistable latches in an unlatched state and to clear the counters 105 and 106. The two output signals are arranged to occur within one pulse period of the input train. The triggering pulse causes any J-K bistable device which is in a SET state to produce an output to a driver 133 before being reset by the reset pulse.

In this embodiment, the output terminals of the binary-to-decimal converters are connected to the gates 109 and 114 such that the gate 109 receives as decimal input 00 and 09, and the gates 110 to 114 receive as decimal inputs, 10 and 03, and 10 and 07, 20 and 05, 40 and 00 and 60 and 00 respectively.

Thus as the number of input shaft pulses are counted, the bistable 116 will latch after 9 pulses, the bistable 119 will latch and the bistable 116 will unlatch after 13 pulses, the bistable 122 will latch and the bistable 119 will unlatch after 17 pulses, the bistable 125 will latch and the bistable 122 will unlatch after 25 pulses, the bistable 128 will latch and the bistable 125 will unlatch after 40 pulses and the bistable 131 will latch and the bistable 128 will unlatch after 60 pulses. It follows from this that in the range between 9 and 13 pulses the J-K bistable device 117 is SET, between 13 and 17 pulses the J-K bistable 120 is SET, and between 17 and 25 pulses, between 25 and 40 pulses, between 40 and 60 pulses, and above 60 pulses, the J-K bistable devices 123, 124, 129 and 132 respectively are in a SET state.

After 21 input shaft pulses, the bistable latch 122 is latched and the J-K bistable device 123 is in a SET state. If at this time the tenth output shaft pulse is produced then the control means 103 is operated and its trigger pulse, applied to all the J-K bistable devices, causes the device 123 to produce an output signal for the driver 133. The driver operates an indicator lamp (not shown) to show that fourth gear is selected. The reset pulse from the control means, applied to all of the bistable latches, unlatches bistable 122 and causes J-K bistable device 123 to return to a RESET state. The reset pulse also clears the counters 105 and 106.

If the third gear ratio had been selected then the tenth output shaft pulse would have been produced after 31 input shaft pulses, when J-K bistable device 126 would have been in a SET state.

It will be appreciated that in the above described embodiment the gear ratios are fixed and that for each particular ratio, 10 output shaft pulses are associated with a fixed number of input shaft pulses. It is possible, however, in an electrically noisy environment, for a transducer pulse to be lost or falsely generated so that in practice, each gear selected is identified by a ratio of input shaft pulses to output shaft pulses within a range of values. Then for the fourth gear having a ratio of 21 : 10 it is sufficient to detect pulse ratios in the range 17 : 10 to 24 : 10 and so on for each gear ratio.

By suitable connections between the binary-to-decimal converters 107 and 108 and the gates 109 to 114 any ranges of pulse ratios can be employed for any gear ratio.

The circuit arrangement of the embodiment is also suitable for use where the pulse frequency ratio of two independent pulse trains is required to be indicated as to its occurrence in one of a number of ranges of values.

What I claim is:

1. A frequency ratio indicating circuit arrangement, operable to indicate within which one of a number of ranges lies the ratio of the pulse repetition frequencies of two pulse trains, comprising first and second input terminals each arranged to receive pulses from an individual pulse train, first counting means operable to count the pulses applied to the first input terminal and to produce a timing signal after a predetermined number of pulses have been counted, second, resettable, counting means having a plurality of output terminals and operable to count pulses applied to the second input terminal to produce at selected output terminals, at predetermined stages in the count, range signals representative of the number of pulses counted, output means comprising a plurality of triggerable output devices each capable of being placed in a SET stage or a RESET state and operable to produce an indication signal if triggered when in a SET state, gating means responsive to the range signals from the second counting means both to SET a different output device at each of said predetermined stages in the count and to RESET a previously SET output device, and control means responsive to the timing signal of the first counting means to apply a triggering signal to all of the output devices and thereafter to apply a RESET signal to the second counting means and to all of the output devices.

2. A circuit arrangement as claimed in claim 1 in which the second counting means comprises a counting stage, the counting stage comprising a counter of input pulses and a binary-to-decimal converter having a plurality of output terminals and operable to provide at each terminal in turn a range signal indicative of the number of pulses counted.

3. A circuit arrangement as claimed in claim 2 in which the binary-to-decimal converter is operable to produce a range signal at a different output terminal for each pulse counted.

4. A circuit arrangement as claimed in claim 3 which comprises one or more further counting stages serially connected with said one counting stage, each being operable when the counter is full to produce a pulse and apply it to the input of the next succeeding stage.

5. A circuit arrangement as claimed in claim 1 in which each triggerable output device comprises a J-K bistable device having J-K and trigger inputs, and a bistable latch having SET and RESET inputs, and two outputs coupled one each to the J and K inputs such that in operation the latch is SET in response to a pulse signal applied to the SET input to provide a continuous signal to the J input until RESET and RESET in response to a pulse signal applied to the RESET input to provide a continuous signal to the K input, the J-K bistable device producing an indication signal at its output if a trigger pulse is applied to the trigger input when a signal is applied to the J input.

6. A circuit arrangement as claimed in claim 5 in which the SET input of each bistable latch is connected in parallel with the RESET input of a single other bistable latch.

7. A circuit arrangement as claimed in claim 5 in which the trigger inputs of all the J-K bistable devices are connected in parallel and to the control means so that all devices are triggered together.

8. A circuit arrangement as claimed in claim 5 in which each of the bistable latches has a further RESET input and all of the further RESET inputs are connected in parallel and to the control means so that all latches may be RESET together.

9. A circuit arrangement as claimed in claim 5 in which the gating means comprises individual gates connected between appropriate output terminals of each stage of the second counting means and the SET inputs of different bistable latches such that in operation each gate is opened uniquely at one of said predetermined stages in the count, and while the count is at that particularly value, to SET a different latch in turn.

10. A circuit arrangement as claimed in claim 1 in which the control means comprises a monostable device responsive to an input signal to provide two output signals separated in time and within the period of the pulse train applied to the first input terminal the first of said signals comprising the triggering signal and the second of said signals comprising the RESET signal.

* * * * *